(12) United States Patent
Oelerich, Jr. et al.

(10) Patent No.: US 7,266,922 B2
(45) Date of Patent: Sep. 11, 2007

(54) FISHING LURES HAVING ELASTOMERIC PORTIONS

(75) Inventors: Francis J. Oelerich, Jr., Eufaula, AL (US); Lanny R. Deal, Eufaula, AL (US); Michael E. McPherson, Eufaula, AL (US)

(73) Assignee: Mann's Bait Company, Eufaula, AL (US)

( * ) Notice: Subject to any disclaimer, the term of this patent is extended or adjusted under 35 U.S.C. 154(b) by 74 days.

(21) Appl. No.: 11/083,422

(22) Filed: Mar. 18, 2005

(65) Prior Publication Data

US 2005/0235550 A1 Oct. 27, 2005
US 2006/0037230 A2 Feb. 23, 2006

(51) Int. Cl.
*A01K 85/00* (2006.01)
(52) U.S. Cl. .................. 43/42.53; 43/42.24
(58) Field of Classification Search ........... 43/42.53, 43/42.24, 42.26, 42.28
See application file for complete search history.

(56) References Cited

U.S. PATENT DOCUMENTS

| | | | | |
|---|---|---|---|---|
| 1,247,955 A | * | 11/1917 | Grube | 43/42.26 |
| 2,290,433 A | * | 7/1942 | Jeffers | 43/42.26 |
| 2,341,999 A | * | 2/1944 | Lennington | 264/255 |
| 2,500,494 A | * | 3/1950 | Jeffers | 43/42.53 |
| 2,718,033 A | * | 9/1955 | Burke | 43/42.53 |
| 2,718,668 A | * | 9/1955 | Burke | 43/42.53 |
| 2,776,518 A | * | 1/1957 | Felmlee | 43/42.24 |
| 2,847,791 A | * | 8/1958 | Simmons | 43/42.26 |
| 2,892,281 A | * | 6/1959 | Schilling et al. | 43/42.36 |
| 2,938,293 A | * | 5/1960 | Richardson | 43/42.24 |
| 3,070,917 A | * | 1/1963 | Rowe, Sr. | 43/42.24 |
| 3,082,562 A | * | 3/1963 | Duncan | 43/42.26 |
| 3,191,336 A | * | 6/1965 | Cordell, Jr. | 43/42.53 |
| 3,218,750 A | * | 11/1965 | Lewin | 43/42.28 |
| 3,268,643 A | * | 8/1966 | Katzenmeyer et al. | 264/250 |
| 3,367,060 A | * | 2/1968 | Abercrombie | 43/42.53 |
| 3,426,467 A | * | 2/1969 | Bryant | 43/42.28 |
| 3,474,496 A | * | 10/1969 | Werner | 264/255 |
| 3,490,165 A | * | 1/1970 | Thomassin | 43/42.24 |
| 3,497,985 A | | 3/1970 | Margulies | |

(Continued)

FOREIGN PATENT DOCUMENTS

JP 10-248439 9/1998

(Continued)

OTHER PUBLICATIONS

Machinist-Materials, Hardness Measurement and Specifications, [retrieved on Feb. 9, 2007]. Retrieved from the Internet:<URL: http://www.machinist-materials.com/hardness.htm>.*

(Continued)

*Primary Examiner*—Darren W. Ark
(74) *Attorney, Agent, or Firm*—Moore & VanAllen, PLLC

(57) ABSTRACT

The present invention provides a fishing lure comprising an elastomeric portion having at least first and second regions. Each region has a durometer hardness on the Shore A scale. At least a portion of the first region is characterized by comparatively high operational stress relative to the second region. The hardness of the first region exceeds the hardness of the second region to thereby selectively improve the strength, toughness and fatigue resistance of the first region.

7 Claims, 5 Drawing Sheets

U.S. PATENT DOCUMENTS

| | | | | |
|---|---|---|---|---|
| 3,537,207 A * | 11/1970 | McClellan et al. | ......... | 43/42.53 |
| 3,543,430 A * | 12/1970 | Brokaw | ...................... | 43/42.24 |
| 3,579,895 A * | 5/1971 | Orn et al. | .................. | 43/42.53 |
| 3,611,614 A * | 10/1971 | Ward | .......................... | 43/42.24 |
| 3,685,192 A * | 8/1972 | Stibbard | .................... | 43/42.24 |
| 3,685,197 A * | 8/1972 | McClellan | ................. | 43/42.24 |
| 3,735,518 A * | 5/1973 | Kleine et al. | .............. | 43/42.24 |
| 3,854,233 A | 12/1974 | Browning, III | | |
| 3,861,073 A * | 1/1975 | Thomassin | ................. | 42/42.24 |
| 3,879,882 A | 4/1975 | Rask | | |
| 4,074,455 A | 2/1978 | Williams, Jr. | | |
| 4,115,488 A * | 9/1978 | Colpitts | ...................... | 264/255 |
| 4,141,170 A * | 2/1979 | Fosher | ...................... | 43/42.24 |
| 4,196,884 A * | 4/1980 | Zeman | ...................... | 43/42.53 |
| 4,214,397 A | 7/1980 | Kent | | |
| 4,335,495 A * | 6/1982 | Buchanan | .................. | 43/42.53 |
| 4,385,025 A * | 5/1983 | Salerno et al. | .............. | 264/255 |
| 4,448,735 A * | 5/1984 | Huge | .......................... | 264/255 |
| 4,672,768 A | 6/1987 | Pippert | | |
| 4,829,695 A * | 5/1989 | Hoecherl | .......................... | 43/3 |
| 4,876,053 A * | 10/1989 | Norton et al. | .............. | 264/255 |
| 5,193,299 A * | 3/1993 | Correll et al. | ............. | 43/42.24 |
| 5,238,642 A * | 8/1993 | Benquet et al. | ............. | 264/250 |
| 5,261,182 A * | 11/1993 | Link | .......................... | 43/42.28 |
| 5,327,672 A * | 7/1994 | Johnson | ..................... | 43/44.91 |
| 5,362,435 A * | 11/1994 | Volpe | .......................... | 264/250 |
| 5,544,766 A * | 8/1996 | Dunn et al. | ................. | 264/255 |
| 5,625,975 A | 5/1997 | Imes | | |
| 5,678,350 A * | 10/1997 | Moore | ........................ | 43/42.37 |
| 5,709,047 A * | 1/1998 | Link | .......................... | 43/42.28 |
| 5,725,892 A * | 3/1998 | Gibbs | ........................ | 43/42.53 |
| 5,815,978 A * | 10/1998 | Huddleston | ................. | 43/42.09 |
| 5,946,848 A * | 9/1999 | Ysteboe et al. | ............ | 43/42.53 |
| 5,960,580 A * | 10/1999 | Link | .......................... | 42/42.53 |
| 6,106,755 A * | 8/2000 | Pfoertner | .................... | 264/255 |
| 6,138,399 A * | 10/2000 | Wilson | ....................... | 43/42.24 |
| 6,145,239 A | 11/2000 | Hirahara et al. | | |
| 6,164,006 A * | 12/2000 | Peterson | .................... | 43/42.24 |
| 6,174,525 B1 * | 1/2001 | Kelley | ............................ | 43/42 |
| 6,192,616 B1 * | 2/2001 | Kent | .......................... | 43/42.24 |
| 6,205,697 B1 * | 3/2001 | Kent | .......................... | 43/42.53 |
| 6,212,818 B1 * | 4/2001 | Huddleston | ................. | 43/42.26 |
| 6,264,870 B1 * | 7/2001 | H.ang.kansson | ............ | 264/255 |
| 6,284,179 B1 * | 9/2001 | Deily et al. | .................. | 264/255 |
| 6,348,169 B1 * | 2/2002 | Stipes et al. | ................. | 264/255 |
| 6,393,757 B2 * | 5/2002 | Bomann | ..................... | 43/42.24 |
| 6,408,567 B1 * | 6/2002 | Clark | ......................... | 43/42.53 |
| 6,419,869 B1 * | 7/2002 | Gotterbauer et al. | ........ | 264/255 |
| 6,532,694 B1 * | 3/2003 | Gathright | .................... | 43/42.53 |
| 6,601,336 B1 * | 8/2003 | Link | .......................... | 43/42.13 |
| 6,796,080 B1 * | 9/2004 | Mathews et al. | ........... | 43/42.13 |
| 6,912,808 B1 * | 7/2005 | Mak | .......................... | 43/42.28 |
| 7,011,780 B2 * | 3/2006 | Hojna | ......................... | 264/255 |
| 7,220,372 B2 * | 5/2007 | Woo et al. | ................... | 264/255 |
| 2001/0047609 A1 * | 12/2001 | Orgeron et al. | ............. | 43/42.31 |
| 2003/0062654 A1 * | 4/2003 | Lamkin | ....................... | 264/250 |
| 2003/0159328 A1 * | 8/2003 | Acker | ........................ | 43/42.37 |
| 2004/0217515 A1 * | 11/2004 | Hojna | ......................... | 264/255 |
| 2006/0143972 A1 * | 7/2006 | Nichols | ...................... | 43/42.09 |
| 2006/0197249 A1 * | 9/2006 | Shih et al. | ................... | 264/250 |
| 2006/0216479 A1 * | 9/2006 | Cowelchuk et al. | ......... | 264/255 |
| 2006/0218845 A1 * | 10/2006 | Moffitt | ....................... | 43/42.15 |

FOREIGN PATENT DOCUMENTS

| | | | |
|---|---|---|---|
| JP | 10-248439 A * | 9/1998 | |
| JP | 2002-136247 | 5/2002 | |
| JP | 2002-136247 A * | 5/2002 | |

OTHER PUBLICATIONS

RubberMill, Technical Data, Durometer . . . The measure of the hardness of rubber compounds, [retrieved on Feb. 10, 2007]. Retrieved from the Internet:<URL: http://www.rubbermill.com/durometer.html>.*

International Search Report from corresponding International Application No. PCT/US2006/009228 mailed Jul. 10, 2006.

* cited by examiner

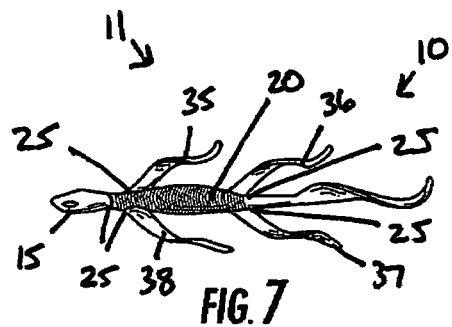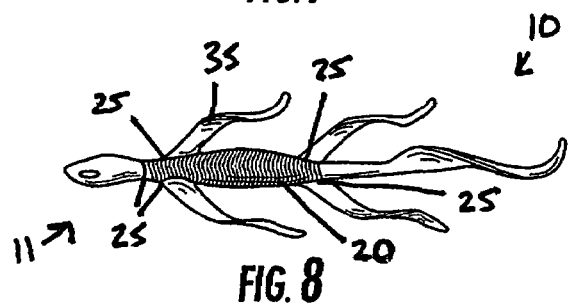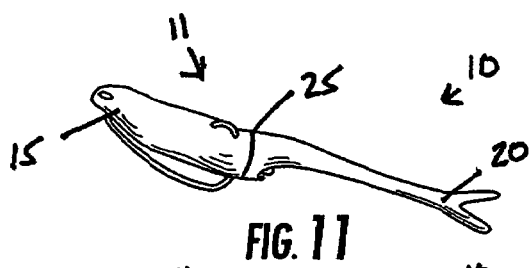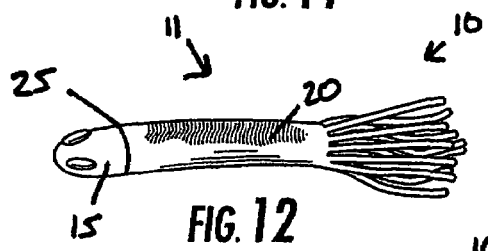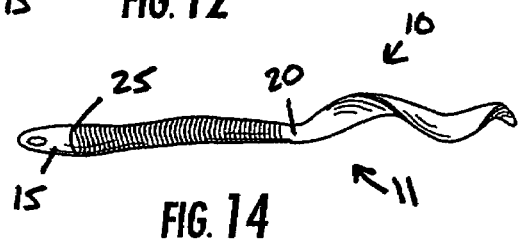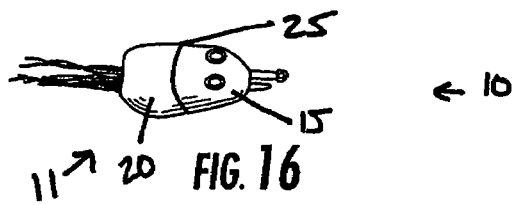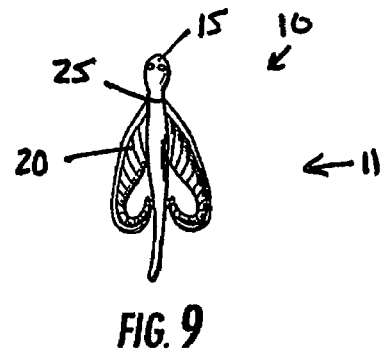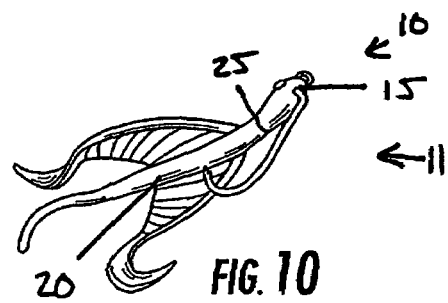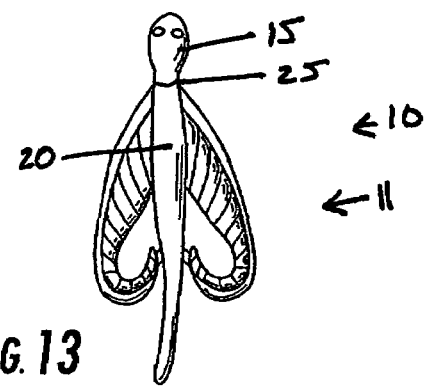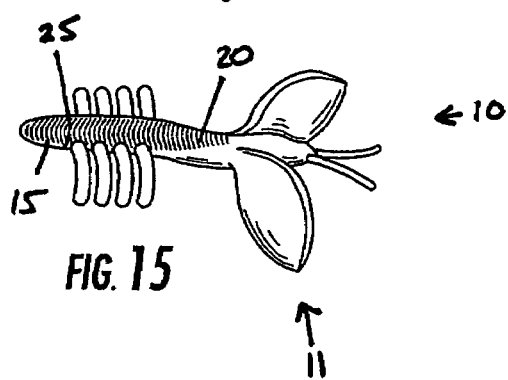

FISHING LURES HAVING ELASTOMERIC PORTIONS

BACKGROUND OF THE INVENTION

1. Field of the Invention

This invention relates generally to fishing lures and, more particularly, to fishing lures having elastomeric portions.

2. Description of Related Art

Fishermen and manufacturers of fishing lures have found elastomeric or other soft plastic materials (collectively referred to herein as "elastomeric materials") advantageous to their craft. The elastomeric portions of the lure are soft and flexible, which gives the lure a more life-like movement (referred to herein as "live-bait action") to attract fish. The flexibility of the elastomeric portions also allows these portions of the lure to stretch or give rather than snap or break when a fish bites down. Typically, the elastomeric portions of the lure are constructed by a relative inexpensive process of injecting a resin into a mold and hardening the resin. Therefore, the elastomeric portions of the lure can have innumerable shapes, i.e., mimic innumerable live baits, by controlling the mold shape.

However, using elastomeric materials in connection with fishing lures also has drawbacks. Elastomeric materials are susceptible to fatigue stress and ambient conditions, such as heat and exposure to ultraviolet light. All of which can contribute to either the hook in the lure pulling out or moving relative to the elastomeric material. Typically, when a hook pulls out of the elastomeric material, the fisherman loses the lure. At a minimum, lost lures add to the cost of fishing both in regards to money and time because of the need for additional lures and the extra time spent setting up a new line. Or worse, lost lures mean lost fish. In cases where the hook only moves within the elastomeric material but remains attached, the new hook position may cause a miscatch. More specifically, the hook may no longer be in a position to actually hook a fish when it strikes the lure because the elastomeric material is in the way.

Accordingly, there remains a need for an improved fishing lure having one or more elastomeric portions that are more robust and durable. The elastomeric portions should be capable of retaining a fishing hook and of resisting degradation from fatigue stress or ambient conditions, such as heat and exposure to ultraviolet light.

BRIEF SUMMARY OF THE INVENTION

The present invention addresses the above needs and achieves other advantages by providing a fishing lure having an elastomeric portion. According to one embodiment, the elastomeric portion has first and second regions. Each region has a durometer hardness on the Shore A scale. At least a portion of the first region is characterized by comparatively high operational stress relative to the second region. Advantageously, the hardness of the first region exceeds the hardness of the second region to thereby selectively improve the strength, toughness and fatigue resistance of the first region.

In one embodiment, the first and second regions are joined at least partially by a chemical bond. In another embodiment, the strength of the chemical bond is greater than the strength of the second region. In yet another embodiment, the first and second regions are joined mechanically. For example, the first region can form a cavity and the second region can form a protuberance, and wherein the cavity is structured to receive the protuberance.

In one embodiment, the first region can be defined based upon the particular region of the elastomeric portion that will be subjected to comparatively high operational stress. For example, in one embodiment the fishing lure includes at least one fish hook, and the first region is defined so that the at least one fish hook extends at least partially through the first region.

The hardness of the first region and the second region can vary. In one embodiment, the hardness of the first region is from approximately 2 to approximately 15 on the Shore A scale and the hardness of the second region is from approximately 1 to approximately 8 on the Shore A scale.

The elastomeric portion can have a variety of configurations and other fish attracting features. In one embodiment, the elastomeric portion has a configuration of a common bait species, such as a worm, grub, snake, eel, fish, salamander, frog, squid, shrimp or crab. In another embodiment, the first and second regions have different colors. In yet another embodiment, at least one of the first or second regions comprises at least one fish attracting element, such as metal flakes.

In one embodiment, the elastomeric portion comprises a third region. The third region has a hardness on the Shore A scale and is joined to at least one of the first region or the second region. In one embodiment, the third region is joined to at least one of the first region or the second region at least partially by a chemical bond. In another embodiment, the third region is at least partially mechanically joined to at least one of the first region or the second region. For example, the first region can form a cavity and the second region can form a protuberance, and wherein the cavity is structured to receive the protuberance.

According to another embodiment of the present invention, the fishing lure comprises an elastomeric portion. The elastomeric portion has a first region and a second region. Each region has a durometer hardness on the Shore A scale. The hardness of the first region exceeds the hardness of the second region. The first region has a hardness on the Shore A scale of approximately 2 to 15. The second region has a hardness on the Shore A scale of approximately 1 to 8. The first and second regions are at least partially joined by a chemical bond. In one embodiment, the strength of the chemical bond is greater than the strength of the second region.

In one embodiment, the first region can be defined based upon the particular region of the elastomeric portion that will be subjected to comparatively high operational stress. For example, in one embodiment the fishing lure includes at least one fish hook, and the first region is defined so that the at least one fish hook extends at least partially through the first region.

The hardness of the first region and the second region can vary. In one embodiment, the hardness of the first region is from approximately 2 to approximately 15 on the Shore A scale and the hardness of the second region is from approximately 1 to approximately 8 on the Shore A scale.

The elastomeric portion can have a variety of configurations and other fish attracting features. In one embodiment, the elastomeric portion has a configuration of a common bait species, such as a worm, grub, fish, snake, eel, salamander, frog, squid, shrimp or crab. In another embodiment, the first and second regions have different colors. In yet another embodiment, at least one of the first or second regions comprises at least one fish attracting element, such as metal flakes.

In one embodiment, the elastomeric portion comprises a third region. The third region has a hardness on the Shore A scale and is joined to at least one of the first region or the second region. In one embodiment, the third region is joined to at least one of the first region or the second region at least partially by a chemical bond. In another embodiment, the third region is at least partially mechanically joined to at least one of the first region or the second region.

The present invention also provides a method of forming a fishing lure. According to one embodiment of the present invention, the method includes joining a first elastomeric region to a second elastomeric region, wherein the first and second elastomeric regions have a durometer hardness on the Shore A scale and the hardness of the first elastomeric region exceeds the hardness of the second elastomeric region. In one embodiment, the method comprises, prior to the joining step, mixing a first elastomeric resin and mixing a second elastomeric resin. In another embodiment, the method includes, subsequent to the first mixing step, heating the first elastomeric resin according to a first predetermined heating schedule and heating the second elastomeric resin according to a second predetermined heating schedule. In another embodiment, the joining step comprises injecting the first elastomeric resin into a first cavity of a die, injecting the second elastomeric resin into a second cavity of the die, contacting at least a portion of the second elastomeric resin to at least a portion of the first elastomeric resin, and cooling the first and second elastomeric resins so that the first and second elastomeric resins bond together to thereby form an integral elastomeric portion. In one embodiment, the contacting step includes removing a partition in the die separating the first cavity from the second cavity.

The present invention has several advantages. The elastomeric portion can be configured to emulate many common live-bait species. In addition, the elastomeric portion may work with any number of fish attracting elements or non-elastomeric portions. The dual durometer hardness of the first and second regions of the elastomeric portion provides a first region having an improved strength, toughness, and fatigue resistance to insert and hold the hook, fishing line connector, weight, fish attracting element, etc. and a comparatively more flexible second region well suited to mimic the movement of live bait in order to better attract fish. The method of constructing the fishing lure is cost effective and can accommodate a plurality of different embodiments. In addition, the method joins the elastomeric regions without requiring additional adhesives or fasteners.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 7 is a perspective view illustrating an elastomeric portion of a fishing lure configured to emulate a salamander, according to one embodiment of the present invention;

FIG. 8 is a perspective view illustrating an elastomeric portion of a fishing lure configured to emulate a salamander, according to another embodiment of the present invention;

FIG. 9 is a perspective view illustrating an elastomeric portion of a fishing lure, according to another embodiment of the present invention;

FIG. 10 is a perspective view illustrating an elastomeric portion of a fishing lure, according to another embodiment of the present invention;

FIG. 11 is a perspective view illustrating an elastomeric portion of a fishing lure, according to another embodiment of the present invention;

FIG. 12 is a perspective view illustrating an elastomeric portion of a fishing lure configured to emulate a squid, according to another embodiment of the present invention;

FIG. 13 is a perspective view illustrating an elastomeric portion of a fishing lure, according to another embodiment of the present invention;

FIG. 14 is a perspective view illustrating an elastomeric portion of a fishing lure configured to emulate an eel, according to one embodiment of the present invention;

FIG. 15 is a perspective view illustrating an elastomeric portion of a fishing lure, according to another embodiment of the present invention;

FIG. 16 is a perspective view illustrating an elastomeric portion of a fishing lure, according to another embodiment of the present invention;

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
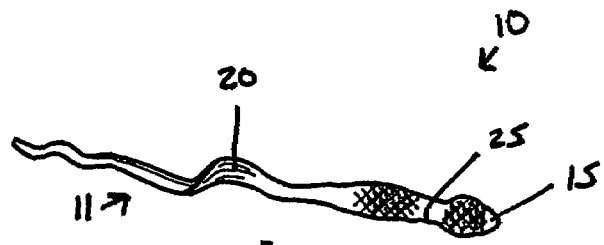
FIG. 1 is a perspective view illustrating an elastomeric portion of a fishing lure configured to emulate a snake, according to one embodiment of the present invention.

Referring generally to FIGS. 1-43, the present invention includes a fishing lure 10 having an elastomeric portion 11. As illustrated in FIG. 1, the elastomeric portion 11 has at least two sections, areas or regions (referred to herein as "regions") 15, 20. Each region 15, 20 is characterized by a durometer hardness, as measured on the Shore A scale. Comparatively, at least one region has a higher or lower hardness than the other region or regions. In one embodiment, the elastomeric portion 11 has a first region 15 characterized by comparatively high operational stress relative to the second region 20. Advantageously, the hardness of the first region 15 exceeds the hardness of the second region 20 to thereby selectively improve the strength, toughness and fatigue resistance of the first region.

Figure 2:
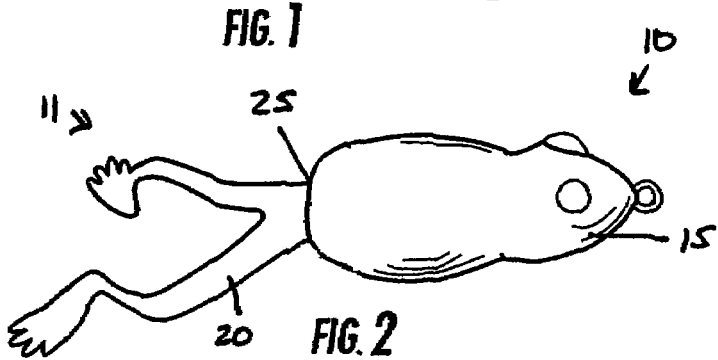
FIG. 2 is a perspective view illustrating an elastomeric portion of a fishing lure configured to emulate a frog, according to one embodiment of the present invention.
Figure 3:
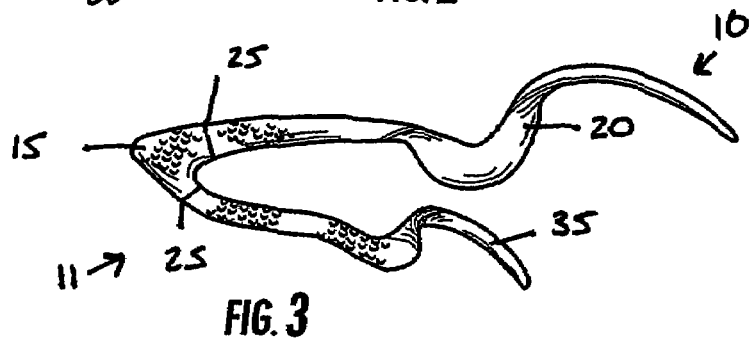
FIG. 3 is a perspective view illustrating an elastomeric portion of a fishing lure, according to another embodiment of the present invention.
Figure 4:
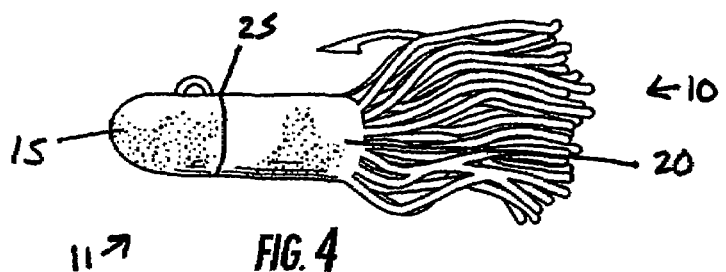
FIG. 4 is a perspective view illustrating an elastomeric portion of a fishing lure configured to emulate a squid, according to one embodiment of the present invention.
Figure 5:
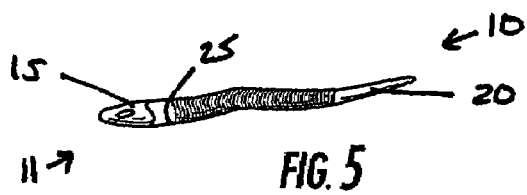
FIG. 5 is a perspective view illustrating an elastomeric portion of a fishing lure configured to emulate a worm, according to one embodiment of the present invention.
Figure 6:
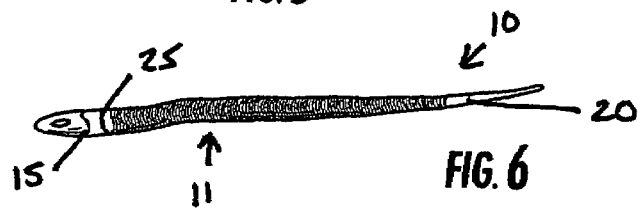
FIG. 6 is a perspective view illustrating an elastomeric portion of a fishing lure configured to emulate a worm, according to another embodiment of the present invention.
Figure 17:
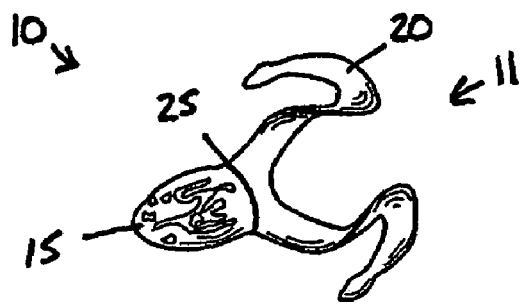
FIG. 17 is a perspective view illustrating an elastomeric portion of a fishing lure configured to emulate a frog, according to another embodiment of the present invention.
Figure 18:
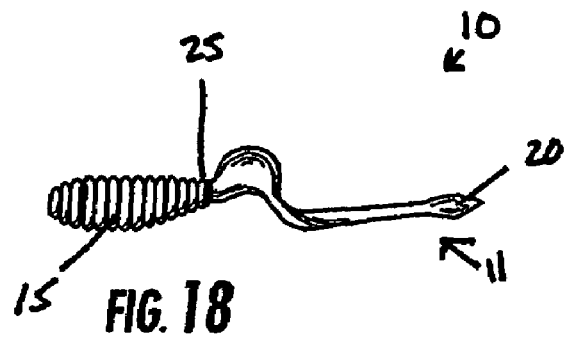
FIGS. 18-20 are perspective views illustrating elastomeric portions of fishing lures configured to emulate a grub, according to other embodiments of the present invention.
Figure 19:
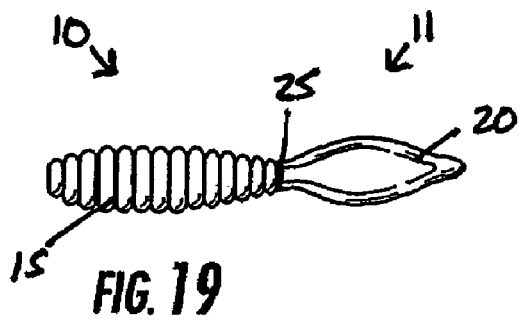
Figure 20:
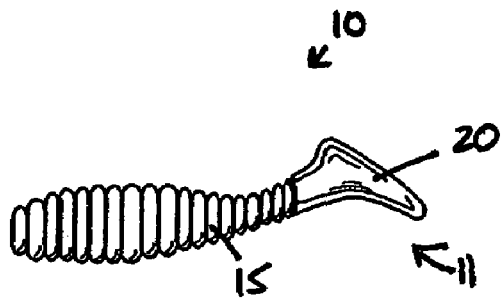
Figure 21:
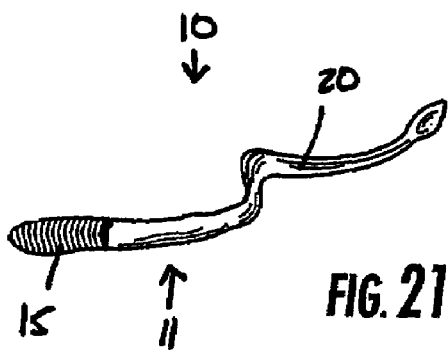
FIG. 21 is a perspective view illustrating an elastomeric portion of a fishing lure configured to emulate a worm, according to another embodiment of the present invention.
Figure 22:
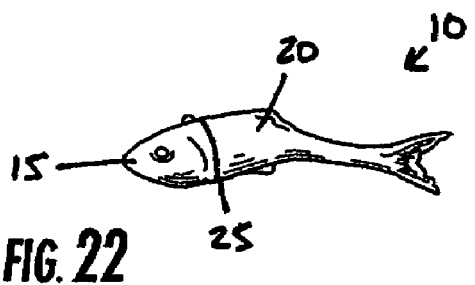
FIGS. 22-25 are perspective views illustrating elastomeric portions of fishing lures configured to emulate a fish, according to other embodiments of the present invention.
Figure 23:
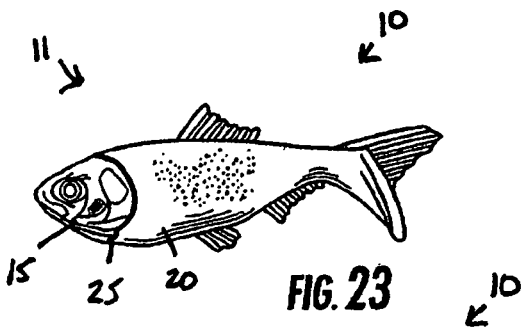
Figure 24:
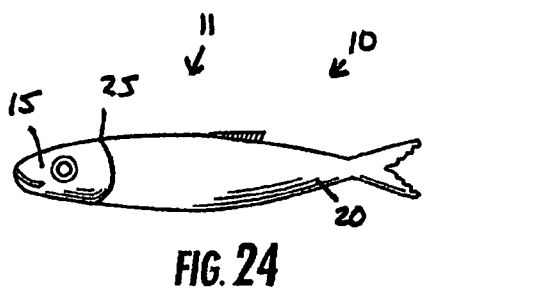
Figure 25:
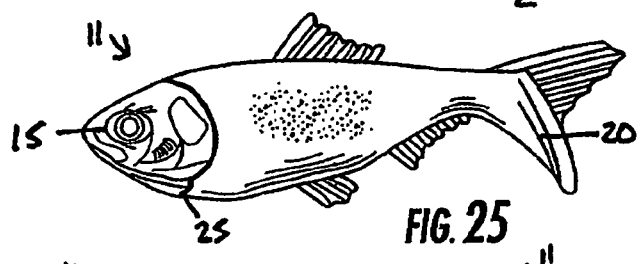
Figure 26:
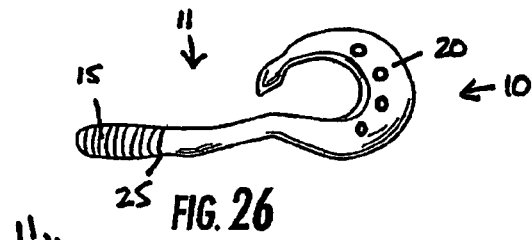
FIG. 26 is a perspective view illustrating an elastomeric portion of a fishing lure configured to emulate a worm, according to another embodiment of the present invention.
Figure 27:
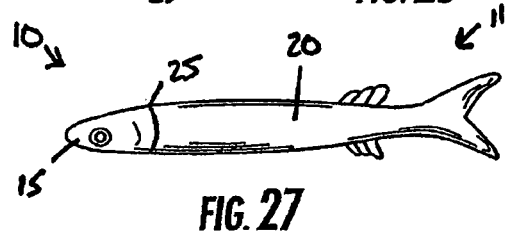
FIGS. 27 and 28 are perspective views illustrating elastomeric portions of fishing lures configured to emulate a fish, according to other embodiments of the present invention.
Figure 28:
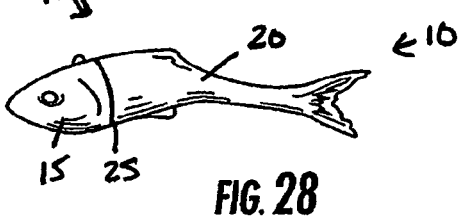
Figure 29:
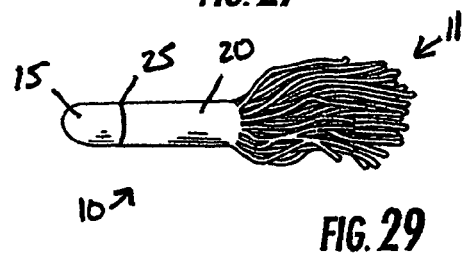
FIG. 29 is a perspective view illustrating an elastomeric portion of a fishing lure configured to emulate a squid, according to another embodiment of the present invention.
Figure 30:
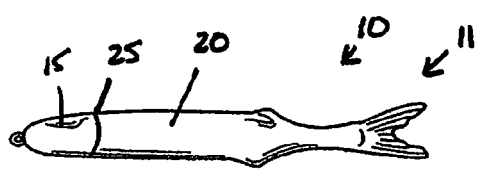
FIG. 30 is a perspective view illustrating an elastomeric portion of a fishing lure configured to emulate a fish, according to another embodiment of the present invention.
Figure 31:
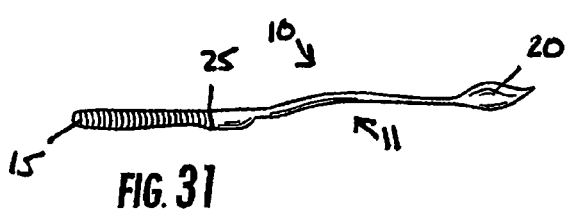
FIGS. 31-35 are perspective views illustrating elastomeric portions of fishing lures configured to emulate a worm, according to other embodiments of the present invention.
Figure 32:
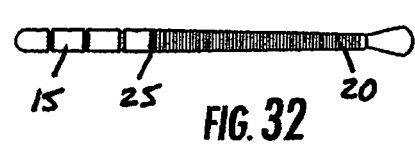
Figure 33:
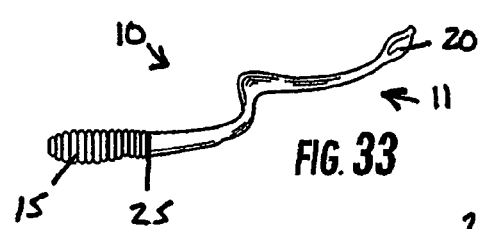
Figure 34:
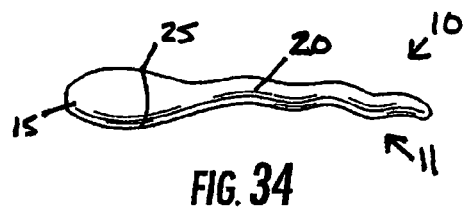
Figure 35:
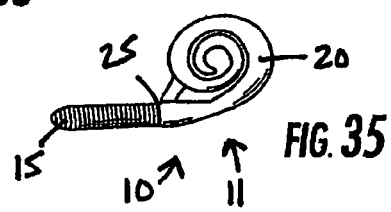
Figure 36:
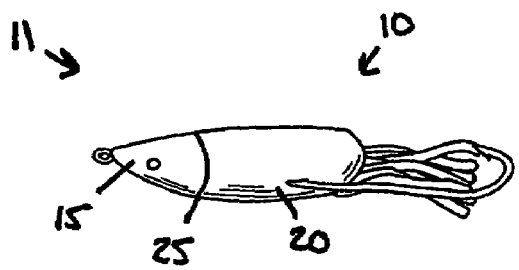
FIGS. 36-43 are perspective views illustrating elastomeric portions of fishing lures, according to other embodiment of the present invention.
Figure 37:
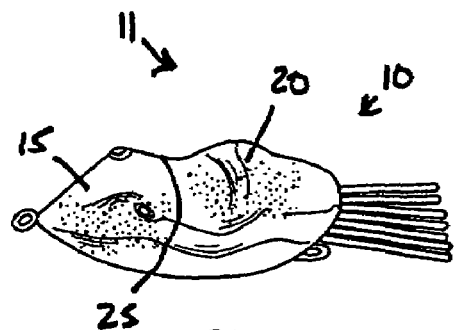
Figure 38:
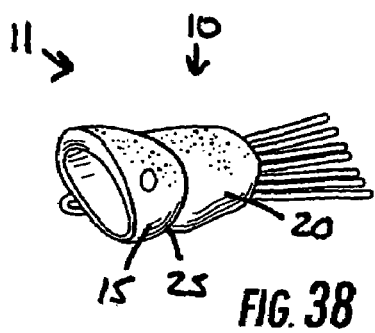
Figure 39:
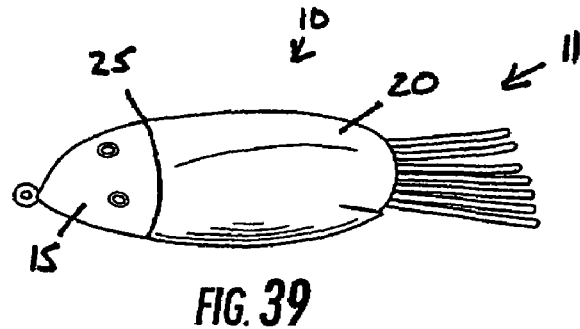
Figure 40:
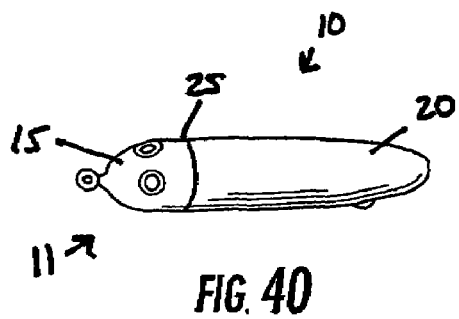
Figure 41:
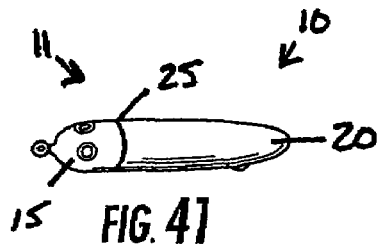
Figure 42:
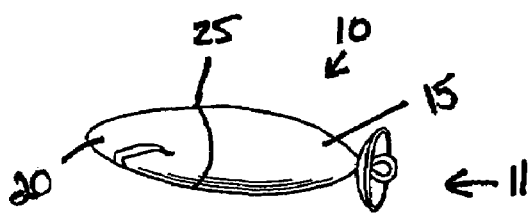
Figure 43:
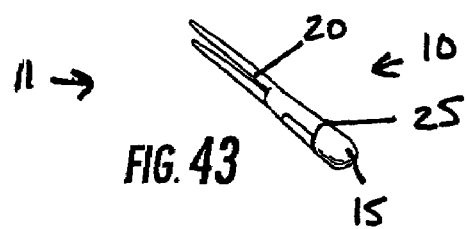

As illustrated by FIGS. 1-43, the elastomeric portion 11 can be configured or shaped into a variety of configurations, including any of the common bait species used by fisherman, depending on the targeted fish. For purposes of example only and not as a limitation, the elastomeric portion 11 can be configured as a worm, grub, snake, leech or similar elongate species, as illustrated in FIGS. 1, 3, 5, 6, 14, 15, 18-21, 26, 31-35 and 43; a fish-like or minnow-like configuration, as illustrated in FIGS. 11, 16, 22-25, 27, 28, 30 and 36-42; a salamander-like configuration, as illustrated in FIGS. 7-10 and 13; a frog-like configuration, as illustrated in FIGS. 2 and 17; or a squid-like configuration, as illustrated in FIGS. 4, 12, and 29. Other configurations also are possible and considered to be within the scope of the present invention. In addition to the configuration of the elastomeric portion 11, the coloring, opacity and texture of the elastomeric portion 11 or the individual regions 15, 20 also can be varied depending on the particular bait characteristics of the target fish.

In other embodiments, the elastomeric portion 11 may be combined with a non-elastomeric portion or portions in order to shape the lure 10 of the present invention into various bait species. For purposes of example only, and not as a limitation, a non-elastomeric diving plate (not shown) may be attached for creating a desirable motion in the lure 10. Furthermore, a variety of fish attracting elements (not shown) may be attached to, or inserted or mixed into the elastomeric portion 11, such as, but not limited to, a rattle, light sticks, light-emitting diodes, scent packets or capsules, gas emitters, weights, or metallic or other bright flakes or particles.

As generally illustrated in FIG. 1, the elastomeric portion 11 includes a first region 15 and a second region 20. The regions 15 and 20 are joined or connected at an interface 25, by a chemical and/or mechanical bond. Examples of the bond between the regions 15, 20 are described in more detail further below. The first region 15 is shaped like a head and the second region 20 is shaped like a body or tail. Together the first and second regions 15, 20, and hence the elastomeric portion 11, resembles a worm-like fishing lure 10. The first elastomeric region 15 has a higher durometer hardness than the second elastomeric region 20 for reasons to be explained. In particular, the durometer hardness of the first region 15 is approximately from 2 to 15 on the Shore A scale and the durometer hardness of the second region 20 is approximately from 1 to 8 on the shore A scale. The relatively lower durometer hardness of the second region 20 provides flexibility, thus imparting to the second region of the elastomeric portion 11 of the lure 10 a more realistic live-bait action. More specifically, the flexible second region 20 moves more like a live-bait would, and thus it is more likely to attract fish. The relatively higher durometer hardness of the first region 15 provides the lure 10 a rigid head area which is better suited to engage and hold a hook (such as the one shown in FIG. 4), a connector (such as a swivel or wire loop) for connecting the lure to a fishing line (not shown), a weight (not shown), or other fish attracting element, such as a spinner (not shown). For holding a hook, the first region 15 includes a range from approximately 2 to 15 durometer hardness on the Shore A scale and, more preferably, a range from approximately 10 to 15 durometer hardness on the Shore A scale to ensure that the elastomeric material is sufficiently rigid to hold the hook, but is still soft enough to allow a hook to be inserted at least partially through the material by hand and without damaging the hook. Therefore, according to the embodiment of FIG. 1, the first region 15 is rigid or hard enough to hold the hook and the second elastomeric region 20 is relatively less hard providing the lure 10 of the present invention with realistic live-bait action.

Although most of the illustrated embodiments have two elastomeric regions 15, 20, in other embodiments of the present invention, the lure 10 may have more elastomeric regions. For example, FIG. 3 illustrates a fishing lure 10 of the present invention having an elastomeric portion 11. This elastomeric portion 11 has a first region 15, second region 20, and third region 35. Together the regions 15, 20, 35 are shaped like a "V" worm. The first region 15 is at the point of the "V" and resembles a head area. The second region 20 and third region 35 are joined at interfaces 25 to the first region 15 and resemble body areas. The hardness of the first region 15 exceeds the hardness of the second and third regions 20, 35. As explained above, the first region 15 is rigid enough to engage and hold a hook (not shown), a connector (such as a swivel or wire loop) for connecting the lure to a fishing line, a weight, or other fish attracting element, such as a spinner. Because the second and third regions 20, 35 are not intended to support a hook, the hardness in these regions 20, 35 may be comparatively lowered than the first region 15. Due to the comparatively low hardness, the second and third region 20, 35 are more flexible than the first region 15 and provide the lure 10 with better live-bait action. Although not necessary, the hardness of the second and third region 20, 35 may be the same.

FIG. 8 is another example of an embodiment having more than two regions 15, 20. According to this embodiment, the elastomeric portion 11 has an additional four elastomeric regions 35, 36, 37, 38 that are configured to look like the appendages of a salamander. These additional regions 35, 36, 37, 38 may have a lower durometer hardness than the first region 15 and second region 20 depending on the desired movement for the lure 10 during operation. Also, the appendage regions 35, 36, 37, 38 are attached to the second region 20 at interfaces 25 by a chemical and/or mechanical bond, similar to the interface 25 between the first region 15 and second region 20 and as described further below.

One of ordinary skill in the art would appreciate the wide number of regions that may be used with the present invention in order to form the numerous kinds of bait species. In general, the regions intended to engage or hold a hook, a connector (such as a swivel or wire loop) for connecting the lure to a fishing line, a weight, or other fish attracting element, such as a spinner will have a comparatively higher hardness on the Shore A scale compare to the regions not intended to engage the hook or other elements or to otherwise provide structural support to the lure 10. The regions not intended to engage the hook or other elements or to otherwise provide structural support to the lure 10 have a lower hardness, which will depend on the desired movement for those regions and the lure 10 considering the targeted fish.

In order to achieve specific durometer ranges for the regions 15, 20, 35, 36, 37, 38 a variety of materials may be used. For purposes of example only and not limitation, a mixture of materials consisting primarily or mostly of the following polymeric materials may be used: Dioctyl Phthalate (DOP), Polyvinyl Chloride (PVC), and an elastomeric polymer emulsion (EPE), such as HYSTRETCH® V60, manufactured and sold by Noveon, Inc. In general, the combination should be approximately 51 to 66.6% of DOP, approximately 11-22.4% of PVC, approximately 5-28% of EPE and approximately 2-6% of other materials. In order to increase durometer hardness, the PVC component should be increased. Conversely, to decrease durometer hardness the PVC component should be decreased.

As stated above the elastomeric regions 15 intended to engage and hold the hook or other elements or to otherwise provide structural support to the lure 10 should have comparatively higher durometer hardness, between approximately 2 to 15 on the Shore A scale and, more preferably approximately 10 to 15 on the Shore A scale, in comparison to the other region or regions 20, 35, 36, 37, 38 not intended to engage the hook or other elements or to otherwise provide structural support to the lure. This hardness provides a material strong, tough and rigid enough to hold the hook or other elements or to otherwise provide structural support to the lure 10 while being soft enough to set the hook through the elastomeric material. For purposes of example only and not limitation, a combination of approximately 66.6% DOP, approximately 22.4% PVC, approximately 5% EPE, and approximately 6% of other material has a durometer hardness of approximately 14 to 15 on the Shore A scale. A combination of approximately 59% DOP, approximately 20.5% PVC, approximately 16% EPE, and approximately 4.5% of all other materials has a durometer hardness of approximately 10 to 12 on the Shore A scale.

Also stated above, it is preferable that one or more of the elastomeric regions 20, 35, 36, 37, 38, such as those representing the body and/or appendage areas of the lure 10, have a comparatively lower durometer hardness, approximately between 1-8 on the Shore A scale in order to provide the lure 10 with realistic live-bait action. For purposes of example only and not limitation, a combination of approximately 57% DOP, approximately 19% PVC, approximately 19% EPE, and approximately 5% of other material has a durometer hardness of approximately 7 to 8 on the Shore A scale. A combination of approximately 51% DOP, approximately 17% PVC, approximately 27% EPE, and approximately 5% of other materials has a durometer hardness of approximately 5 to 6 on the Shore A scale. A combination of approximately 55% DOP, approximately 14% PVC, approximately 28% EPE, and approximately 3% of other materials has a durometer hardness of approximately 3 to 4 on the Shore A scale. A combination approximately of 59% DOP, approximately 11% PVC, approximately 28% EPE, and approximately 2% all other materials has a durometer hardness of approximately 1 to 2 of the Shore A scale. The "other materials" generally have a minimal impact on hardness; however, the use of other materials may be used to influence, among other things, the color, texture, smell, and flavoring of the elastomeric material and, thus, the fishing lure 10.

The present invention also provides a method of forming or constructing a fishing lure 10. In one embodiment, the lure 10 is constructed from an injection molding process. More specifically, for each region of the elastomeric portion 11, a combination of materials, based on the desired durometer hardness, is mixed together and heated beyond its melting point to form a resin. Therefore the first region 15 will have a corresponding first resin, the second region 20 will have a corresponding second resin and so on. Next, one resin for example, but not limited to, the first resin is injected into a mold or die cavity (not shown). The die cavity is configured based on the desired configuration of the lure 10. In one embodiment, the die cavity is initially partitioned into two or more regions or sections, each of which corresponds to one of the regions 15, 20, 35, 36, 37, 38 of elastomeric material having different durometer hardness. For purposes of example only and not limitation, the cavity may have a divider or other partition that can be positioned in the cavity in order to divide or delimit the cavity into two or more cavity regions. As the first resin is injected into the die cavity, the first resin is initially contained only in those portions of the die cavity that corresponds to the first region 15 of the elastomeric portion 11 by the partition (referred to herein as the "first cavity"). In other embodiments, the second resin (or third resin, etc.) can be injected first. Once the first resin enters into the first cavity of the die it will immediately begin to set-up, i.e., the resin will start to polymerize or solidify. After allowing for the set-up to begin, the partition is removed. For example, the divider is slid out of the die cavity. The second resin is injected into the cavity. Again, this resin is injected into those portions of the die cavity that correspond to the second resin's corresponding elastomeric region in the elastomeric portion 11 (referred to herein as the "second cavity").

With the partition removed, at least a portion of the first and second resins will be in contact at an interface 25. The contact will occur proximate to where the partition was previously positioned. Because the first resin began to solidify its viscosity is high enough to keep the first resin mostly intact and limit the intermixing of the two resins, except at the interface 25. The intermixing at the interface is desirable. It forms a chemical and mechanical bond between the two elastomeric regions 15, 20 as the regions 15, 20 complete the solidification process. The bond created at the interface 25 may be stronger than the strength within one of the regions, especially if the region has a relatively lower hardness on the Shore A scale. A similar process is also employed for lures 10 of the present invention having more than two regions of an elastomeric portion 11.

According to another embodiment of the present invention (not shown), the first region 15 and the second region 20 (or third, fourth, etc. regions) can be formed so as to increase the surface area at the interface 25 to thereby increase the chemical and mechanical bond between the first and second regions. For purposes of example only and not limitation, the first region 15 can be formed with a void or cavity and the second region 20 can be formed with a protuberance, and wherein the cavity is structured to receive the protuberance to increase the surface area at the interface 25.

The present invention has several advantages. The elastomeric portion 11 can be configured to emulate many common live-bait species. In addition, the elastomeric portion 11 may work with any number of fish attracting elements or non-elastomeric portions. The dual durometer hardness of the first and second regions 15, 20 of the elastomeric portion 11 provides a first region 15 having an improved strength, toughness, and fatigue resistance to insert and hold the hook, fishing line connector, weight, fish attracting element, etc. and a comparatively more flexible second region 20 well suited to mimic the movement of live bait in order to better attract fish. The method of constructing the fishing lure 10 is cost effective and can accommodate a plurality of different embodiments. In addition, the method joins the elastomeric regions 15, 20 without requiring additional adhesives or fasteners.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a fishing lure, comprising:
   joining a first elastomeric region to a second elastomeric region so as to define an interface, wherein the first and second elastomeric regions each have a hardness on the Shore A scale and the hardness of the first elastomeric region is from approximately 2 to approximately 15 and the hardness of the second elastomeric region is from approximately 1 to approximately 8 and wherein the hardness of the first elastomeric region exceeds the hardness of the second elastomeric region, said joining step comprises:
      providing a die cavity having a first cavity region and a second cavity region divided by a partition;
      injecting a first elastomeric resin into the first cavity region to form the first elastomeric region;
      injecting a second elastomeric resin into the second cavity region to form the second elastomeric region;
      removing the partition in the die cavity separating the first cavity region from the second cavity region and contacting at least a portion of the second elastomeric resin to at least a portion of the first elastomeric resin at the interface; and
      cooling the first and second elastomeric resins so that the first and second elastomeric resins bond together at the interface to thereby form an integral elastomeric portion.

2. The method according to claim 1 further comprising:
   prior to said step of injecting the first elastomeric resin, mixing the first elastomeric resin; and
   prior to said step of injecting the second elastomeric resin, mixing the second elastomeric resin.

3. The method according to claim 2 further comprising:
   subsequent to said step of mixing the first elastomeric resin, heating the first elastomeric resin according to a first predetermined heating schedule; and
   subsequent to said step of mixing the second elastomeric resin, heating the second elastomeric resin according to a second predetermined heating schedule.

4. The method according to claim 2, wherein the step of mixing the first elastomeric resin includes mixing a dioctyl phthalate component with one or more other polymeric components and the step of mixing the second elastomeric resin includes mixing a dioctyl phthalate component with one or more other polymeric components.

5. The method according to claim 4, wherein the one or more other polymeric components include a polyvinyl chloride component and an elastomeric polymer emulsion component.

6. The method according to claim 2, wherein the step of mixing the first elastomeric resin includes mixing a combination of approximately 51 to 66.6% of a dioctyl phthalate component, approximately 11 to 22.4% of a polyvinyl chloride component, approximately 5 to 28% of an elastomeric polymer emulsion component, and approximately 2 to 6% of one or more other components; and the step of mixing the second elastomeric resin includes mixing a combination of approximately 51 to 66.6% of a dioctyl phthalate component, approximately 11 to 22.4% of a polyvinyl chloride component, approximately 5 to 28% of an elastomeric polymer emulsion component, and approximately 2 to 6% of one or more other components.

7. The method according to claim 1, wherein the step of removing the partition is prior to the step of injecting the second elastomeric resin into the second cavity region.

* * * * *